(12) United States Patent
Kitamura

(10) Patent No.: US 9,621,740 B2
(45) Date of Patent: Apr. 11, 2017

(54) OPERATION OF MULTIFUNCTIONAL PRINTER OVER PEER TO PEER NETWORK BASED ON PORT DETECTION

(71) Applicant: KYOCERA Document Solutions Inc., Osaka (JP)

(72) Inventor: Mitsuhiro Kitamura, Concord, CA (US)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/740,119

(22) Filed: Jun. 15, 2015

(65) Prior Publication Data

US 2016/0366289 A1    Dec. 15, 2016

(51) Int. Cl.
*G06F 15/00* (2006.01)
*H04N 1/00* (2006.01)
*G06F 3/12* (2006.01)

(52) U.S. Cl.
CPC ....... *H04N 1/00103* (2013.01); *G06F 3/1236* (2013.01); *G06F 3/1292* (2013.01); *H04N 2201/0041* (2013.01); *H04N 2201/0055* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2004/0143651 | A1* | 7/2004 | Allen | H04L 29/06 709/221 |
| 2005/0024671 | A1* | 2/2005 | Abe | G06F 3/1204 358/1.13 |
| 2005/0078336 | A1* | 4/2005 | Ferlitsch | H04N 1/00204 358/1.15 |
| 2006/0221368 | A1* | 10/2006 | Higuchi | G06F 3/1204 358/1.13 |
| 2007/0094499 | A1* | 4/2007 | Dokuni | G06F 21/608 713/168 |
| 2009/0217268 | A1* | 8/2009 | Pandit | G06F 3/1288 718/100 |
| 2009/0268241 | A1* | 10/2009 | Choi | G06F 3/1204 358/1.15 |
| 2010/0177340 | A1* | 7/2010 | Huster | H04L 67/125 358/1.15 |
| 2010/0214604 | A1 | 8/2010 | Hosono et al. | |
| 2012/0188594 | A1* | 7/2012 | Jessen | G06F 3/1219 358/1.15 |
| 2015/0029552 | A1* | 1/2015 | Nishizawa | G06F 3/1253 358/1.15 |

(Continued)

FOREIGN PATENT DOCUMENTS

JP    2008200898    4/2008

*Primary Examiner* — Helen Q Zong
(74) *Attorney, Agent, or Firm* — West & Associates, A PC; Stuart J. West; Shaun Sluman

(57) ABSTRACT

A method of determining which of a multifunctional printer's multiple functions a client device is requesting by determining an operation associated with a network port through which an operation request from the client device is received. The multifunctional printer can open multiple network ports each associated with a different operations, such that identification of the network port that the operation request was sent to can indicate which operation the client device is requesting.

20 Claims, 9 Drawing Sheets

(56) References Cited

U.S. PATENT DOCUMENTS

2015/0189114 A1* 7/2015 Hayakawa ......... H04N 1/00915
　　　　　　　　　　　　　　　　　　　　　　358/1.13
2016/0011828 A1* 1/2016 Takayama ............. G06F 3/1221
　　　　　　　　　　　　　　　　　　　　　　358/1.13

* cited by examiner

OPERATION OF MULTIFUNCTIONAL PRINTER OVER PEER TO PEER NETWORK BASED ON PORT DETECTION

BACKGROUND

Field of the Invention

The present disclosure relates to multifunctional printers, particularly receiving operation requests at multifunctional printers from client devices over a peer to peer network.

Background

Printers, copiers, scanners, and fax machines are commonly used in offices and other settings. Multifunctional printers (MFPs), also known as "multifunctional products" or "multifunctional systems," combine the functionalities of printers, copiers, scanners, fax machines, and/or other devices, such that multiple operations of single device can be used instead of having many devices on hand that are each dedicated to a single operation.

In many situations, an MFP is connected to a network, and client devices such as computers or mobile devices can operate the MFP by exchanging data with the MFP over the network via a server, router, or other intermediate hardware. For example, an office can set up an internal local area network (LAN), and connects its MFP to a print server. When a computer connected to the office's LAN wants to print a document using the MFP, it can send the document's data over the LAN to the print server, which can then reroute it to the MFP for printing. These types of connections are common, but can lead to problems when there are issues with the network. For instance, client devices can often fail to connect with an MFP when a server fails or there is network congestion, leading to frustration and decreased productivity.

As an alternate connection method, MFPs have recently been developed that can connect with client devices over peer to peer networks without routing data through a centralized server. Such peer to peer networks include direct connections using Bluetooth, Wi-Fi Direct, Near Field Communication (NFC), wireless ad hoc networks, Universal Plug and Play (UPnP), Bonjour, zero-configuration networks, and/or any other type of P2P network. A client device can thus be paired with an MFP through a P2P network rather than having data pass through centralized hardware before reaching the MFP. The client device can then exchange data with the MFP over the P2P network without worrying about issues on a larger network.

While P2P connections between client devices and MFPs can be useful for these and other reasons, existing methods of informing a MFP about which of its many operations is being requested by a client device can be problematic. Some solutions can involve the client device sending a message to the MFP describing the type of operation being requested, but this can lead to delays as the MFP interprets the message. For example, an operation request received by an MFP at a common port used for all communications may need to be interpreted by multiple applications, functions, or systems within the MFP to determine which operations are actually being requested, which can take time and/or resources.

What is needed is a system and method for receiving an operation request from a client device at a network port open at an MFP, such that the MFP can determine the type of requested operation from the identity of the network port through which the operation request was received.

SUMMARY

The present disclosure provides a method for receiving an operation request at a multifunctional printer over a peer to peer network and performing an operation associated with the operation request. The method comprises providing a multifunctional printer having a plurality of network ports opened, with each of the plurality of network ports being associated with a different port number. The method also comprises associating each port number associated with one of the plurality of network ports with a specific operation type in memory at the multifunctional printer. The method further comprises establishing a connection between the multifunctional printer and a client device over a peer-to-peer network. The method also comprises receiving an operation request at the multifunctional printer from the client device over the peer to peer network through one of the plurality of network ports. The method additionally comprises determining an operation associated with the operation request at the multifunctional printer by finding the operation type associated with the port number of the one of the plurality of network ports through which the operation request was received. The method further comprises performing the operation with the multifunctional printer.

The present disclosure also provides a multifunctional printer comprising a printer, a scanner, a processor configured to control the printer and the scanner, a communication interface in communication with the processor a memory device in communication with the processor, and an operation database stored in the memory device. The communication interface can open a plurality of network ports each associated with a different port number. The operation database can comprise preset associations between each port number and an operation type. The communication interface can be configured to establish a connection with a client device over a peer-to-peer network and receive an operation request from the client device over the peer to peer network through one of the plurality of network ports. The processor can determine an operation associated with the operation request by finding the preset association between the port number of the network port through which the operation request was received and a particular operation type in the operation database. The processor can instruct the printer to receive and print a document from the client device when the operation is a print function. The processor can instruct the scanner to scan a document and send a scanned version to the client device when the operation is a scanner function.

The present disclosure also provides a method for receiving an operation request at a multifunctional printer over a peer to peer network and performing an operation associated with the operation request. The method comprises providing a multifunctional printer having a plurality of network ports opened, with each of the plurality of network ports being associated with a different port number. The method also comprises associating each port number associated with one of the plurality of network ports with a specific operation type in memory at the multifunctional printer. The method further comprises establishing a connection between the multifunctional printer and a client device over a peer-to-peer network. The method also comprises receiving an operation request at the multifunctional printer from the client device over the peer to peer network through one of the plurality of network ports. The method additionally comprises determining an operation associated with the port number of the one of the plurality of network ports through which the operation request was received. The method comprises performing a print operation when the operation is determined to be a print operation by retrieving a print document from the client device and printing the print document at the multifunctional printer. The method comprises performing a scan operation when the operation is determined to be a scan operation by scanning a scan document at the multifunctional printer and transmitting a scanned version of the scan document from the multifunctional printer to the client device. The method comprises performing a fax operation when the operation is determined to be a fax operation by retrieving a fax document from the client device and faxing the fax document from the multifunctional printer to an external fax machine. The method comprises, performing an upload operation when the operation is determined to be an upload operation by retrieving a file from the client device and storing the file in memory connected to the multifunctional printer.

The present disclosure also provides a method for requesting that a multifunctional printer perform an operation. The method comprises establishing a connection between an external device and a multifunctional printer over a peer-to-peer network. The method also comprises sending an operation request from the external device to the multifunctional printer over the peer to peer network, with the operation request being sent to a specific network port on the multifunctional printer. The method further comprises receiving confirmation information from the multifunctional printer that the multifunctional printer is performing an operation associated with a port number associated with the specific network port.

The present disclosure also provides a system comprising a multifunctional printer and an external device in data communication with the multifunctional printer over a peer-to-peer network. The multifunctional printer can comprise a communication interface that opens a plurality of network ports each associated with a particular port number, and an operation database that associates each particular port number with a particular operation type. The external device can be configured to send an operation request to the multifunctional printer over the peer to peer network, with the operation request being sent to a different network port on the multifunctional printer based on the type of operation requested. The multifunctional printer can be configured to determine the operation type associated with the particular port number of the network port through which the operation request was received and to perform an operation of that operation type.

DETAILED DESCRIPTION

Figure 1:
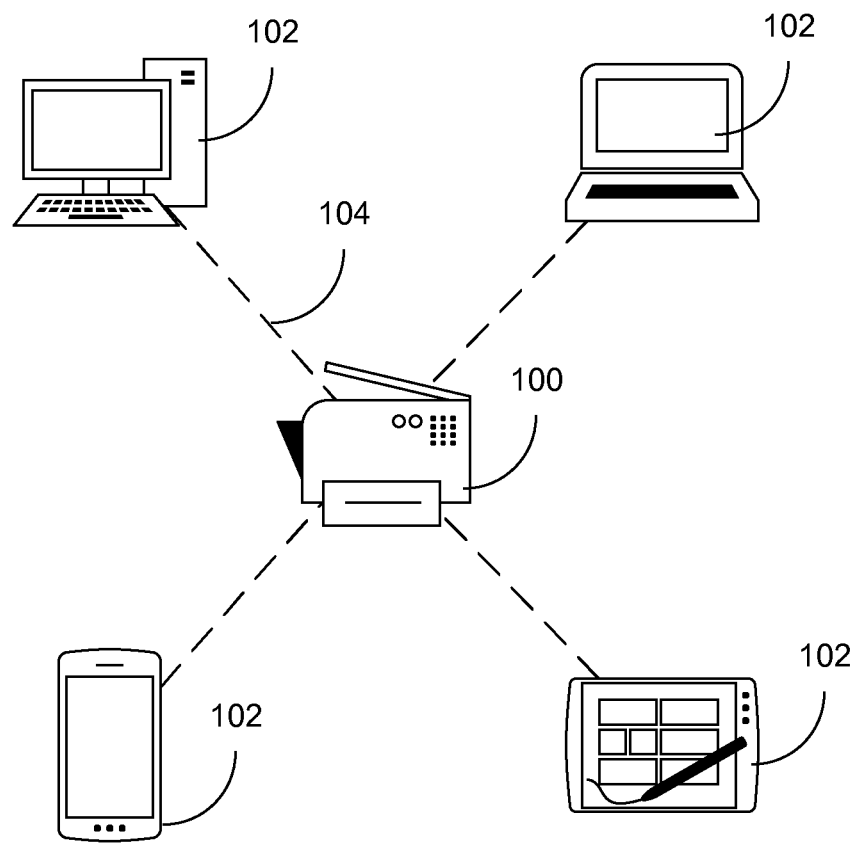
FIG. 1 depicts a multifunctional printer (MFP) connected to client devices over a peer to peer (P2P) network.

FIG. 1 depicts a multifunctional printer (MFP) 100, also known as a "multifunctional product" or "multifunctional system," connected to client devices 102 over a peer to peer (P2P) network 104. By way of a non-limiting example, the MFP 100 can be an "all-in-one" machine that has a plurality of different functions such as printing, copying, scanning, faxing, and/or other functions.

Figure 2:
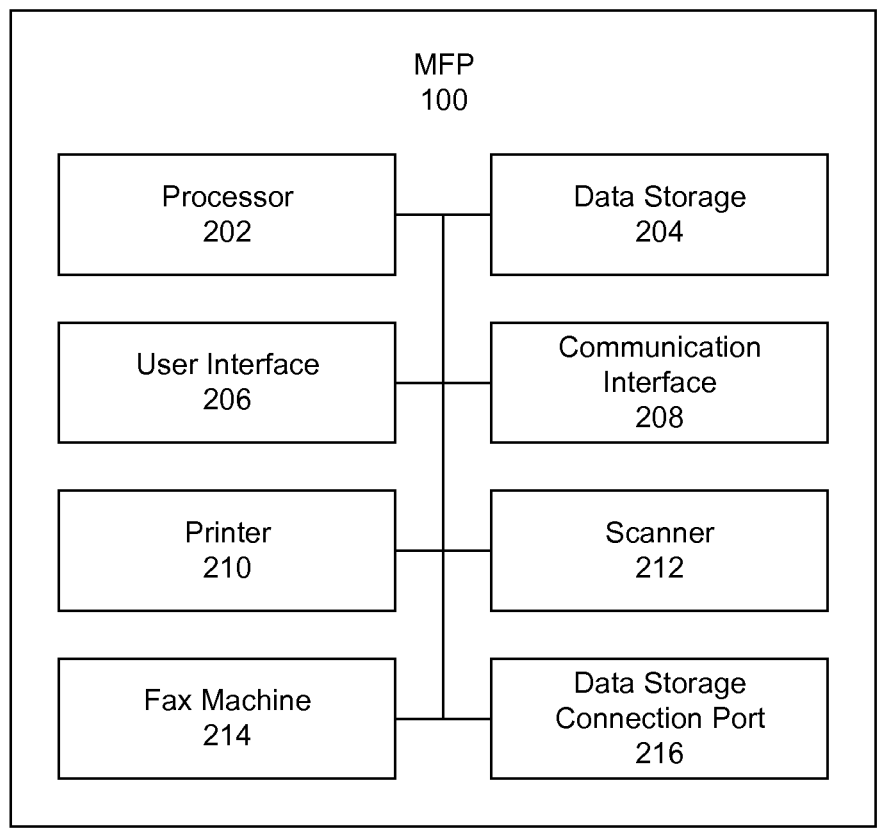
FIG. 2 depicts components of an exemplary MFP.

As shown in FIG. 2, an MFP 100 can comprise a processor 202, data storage 204, a user interface 206, and a communication interface 208. The processor 202 can be a chip, circuit or controller configured to direct the operations of the MFP 100, such as an application-specific integrated circuit (ASIC), central processing unit (CPU), graphics processing unit (GPU), or any other chip, circuit, or controller. In some embodiments a plurality of chips, circuits, and/or controllers can operate together to direct the operations of the MFP 100. Data storage 204 can be one or more internal digital storage devices, such as random access memory (RAM), flash memory, a hard disk drive, any/or any other type of digital memory. The user interface 206 can comprise hardware and/or software elements for receiving instructions from users and/or displaying information to users. By way of various non-limiting examples, the user interface 206 can comprise a screen and/or input devices, such as LCD screens, touchscreens, buttons, indicator lights, speakers, graphical user interfaces, and/or any other input or output device. The MFP's communication interface 208 can be a networking device configured to communicate with client devices 102 over a P2P network 104 via a wired or wireless connection.

The MFP 100 can also comprise one or more of: a printer 210, scanner 212, fax machine 214, and a data storage connection port 216. The MFP's printer 210 can be a black and white and/or color printer, such as a laser printer or inkjet printer, that is configured to print text and/or images onto paper from a paper tray in the MFP 100. The MFP's scanner 212 can be a black and white and/or color scanner configured to scan text and/or images on documents that are either placed on a scanner bed or platen in the MFP 100 or are placed in a document feeder in the MFP 100 such that the scanner 212 sequentially pulls and scans individual pages from the document feeder. The MFP's fax machine 214 can be configured to scan documents with the scanner 212 or with a separate dedicated fax scanner in the MFP 100. Documents scanned by the MFP 100 or received digitally from a client device 102 or other source can be faxed to another fax machine via a fax connection over a telephone line connected to the MFP 100 or over a network connection such as over the internet. The MFP's data storage connection port 216 can be a physical connector configured to selectively accept a removable digital storage device, such as a USB flash drive, external hard disk drive, memory card, or any other removable data storage device. The MFP 100 can be configured to exchange data with a data storage device connected to the data storage connection port 216.

Figure 3:
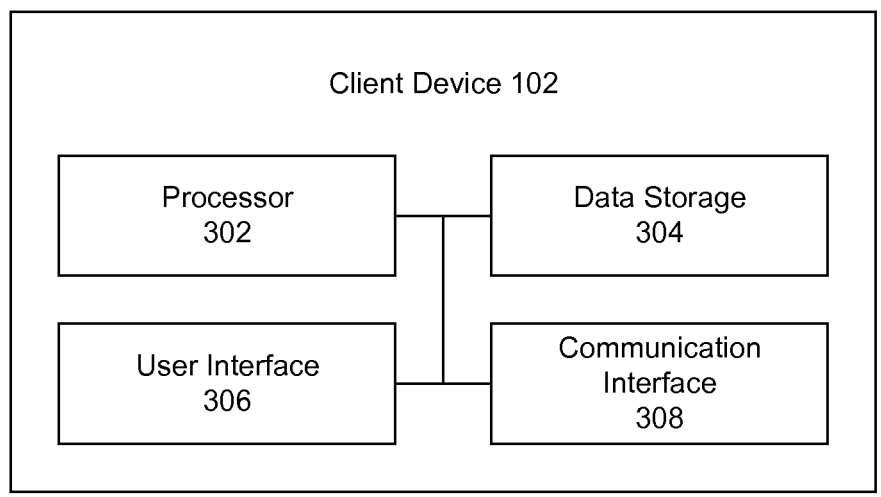
FIG. 3 depicts components of an exemplary client device.

Each client device 102 can be a device configured to connect with the MFP's communication interface 208 over a P2P network 104. By way of non-limiting examples, client devices 102 can be smartphones, tablet computers, personal computers, and/or any other device. As shown in FIG. 3, a client device 102 can comprise a processor 302, data storage 304, a user interface 306, and a communications interface 308. The processor 302 can be a chip or controller configured to direct the operations of the client device 102. Data storage 304 can be one or more internal digital storage devices, such as random access memory (RAM), flash memory, a hard disk drive, any/or any other type of digital memory. The user interface 306 can comprise hardware and/or software elements for receiving instructions from users and/or displaying information to users. By way of various non-limiting examples, the user interface 306 can comprise a screen and/or input devices, such as LCD screens, touchscreens, buttons, indicator lights, speakers, graphical user interfaces, and/or any other input or output device. The client device's communication interface 308 can be a networking device configured to communicate with the MFP 100 over a P2P network 104 via a wired or wireless connection.

The P2P network 104 can be any network or connection that links the MFP 100 with one or more client devices 102, such that the linked devices can exchange data over the P2P network 104 without routing the data through an intermediate or centralized server. By way of various non-limiting examples, the MFP's communication interface 208 can connect with a client device's communication interface 308 via a wireless or wired connection over a P2P network 104 such as a: Bluetooth connection, Wi-Fi Direct connection, Near Field Communication (NFC) connection, wireless ad hoc network, Universal Plug and Play (UPnP) connection, Bonjour connection, zero-configuration network connection, and/or any other type of P2P connection or network.

Figure 4:
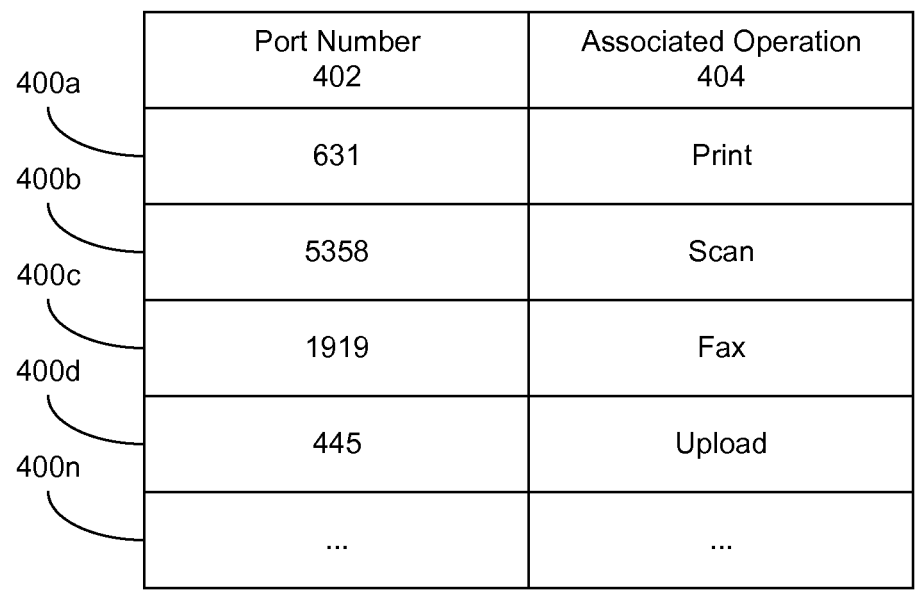
FIG. 4 depicts an exemplary list of associations between network ports and operations.

FIG. 4 depicts a non-limiting, exemplary embodiment of associations between network ports 400, port numbers 402, and types of operations 404. As shown in FIG. 4, the MFP 100 can open a plurality of network ports 400 through which data can be exchanged with client devices 102 over a P2P network. In some embodiments the network ports 400 can be Transmission Control Protocol (TCP) ports, User Datagram Protocol (UDP) ports, or any other type of network port. The opened network ports 400 can be associated with a network address of the MFP 100, such as an Internet Protocol (IP) address. The network ports 400 can provide interfaces between an application running on a client device 102 and the MFP 100. The MFP 100 can monitor each of the opened network ports 400 for incoming operation requests 500, as will be explained below.

Each network port 400 can be associated with a unique port number 402. Additionally, each network port 400 can be associated with a particular operation 404. By way of a non-limiting example, in some embodiments a first network port 400 can be opened and associated with a print operation 404 that can be performed by the MFP 100, a second network port 400 can be opened and associated with a scan operation 404 that can be performed by the MFP 100, a third network port 400 can be opened and associated with a fax operation 404 that can be performed by the MFP 100, and a fourth network port 400 can be opened and associated with an upload operation 404 that can be performed by the MFP 100. In some embodiments, the associations between network ports 400, port numbers 402, and/or operations 404 can be stored in an index file, in a database, or in any other format in the MFP's data storage 204.

Figure 5:
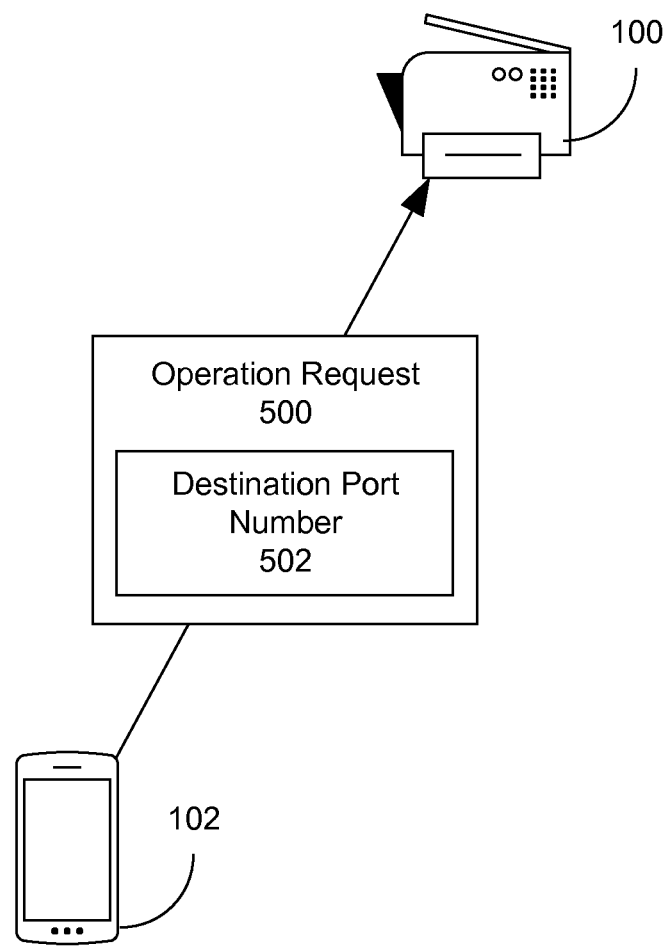
FIG. 5 depicts an operation request being sent from a client device to an MFP over a P2P network.

FIG. 5 depicts an operation request 500 being sent from a client device 102 to an MFP 100 over a P2P network 104. An operation request 500 can comprise one or more data packets, such as TCP or UDP packets, that can be sent from the client device 102 to the MFP 100. The operation request 500 can have a header indicating a destination port number 502 to which it should be delivered at the MFP 100. By way of a non-limiting example, the client device 102 can send an operation request 500 to an MFP's network address, such as its IP address, and the MFP 100 can accept the operation request 500 at the network port 400 matching the destination port number 502 specified in the operation request 500.

As shown in FIG. 5, a client device 102, and/or a software application running on the client device 102, can send an operation request 500 to a specific network port 400 opened at the MFP 100, as specified by a destination port number 502 in the operation request 500. The operation request 500 can be an indication to the MFP 100 that the client device 102 is requesting that the MFP 100 perform an operation. In some embodiments, the operation request 500 does not specify the type of operation 404 being requested, but the MFP 100 can determine which operation is being requested by identifying the network port 400 to which the client device 102 sent the operation request 500, and finding an operation 404 previously associated with that network port 400 at the MFP 100.

In some embodiments an application at the client device 102 can know the associations between operations 404 and network ports 400 at the MFP 100, such that it can use those associations to insert the correct destination port number 502 in an operation request 500 based on which operation 404 the client device 102 is requesting. By way of a non-limiting example, in some embodiments the associations between operations 404 and network ports 400 can be standardized or can be preset based on the MFP's model number, such that the application can use the preset associations to generate an operation request 500. In other embodiments, an application at the client device 102 can request a list of new or updated associations between network ports 400 and operations 404 from the MFP 100 at any time, such as when the client device 102 pairs with the MFP 100 or reconnects with the MFP 100.

Figure 6:
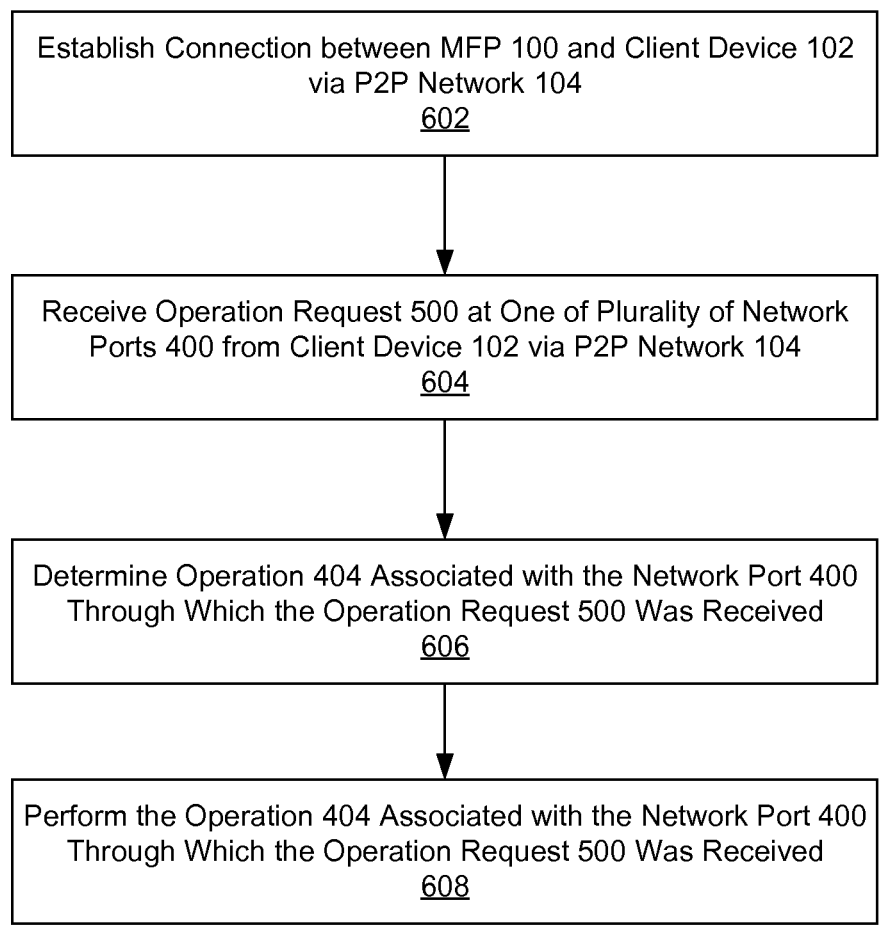
FIG. 6 depicts an exemplary process for determining operations of an MFP based on an operation request received from a client device over a P2P network.

FIG. 6 depicts an exemplary process for determining operations of an MFP 100 based on an operation request 500 received from a client device 102 over a P2P network 104.

At step 602, the MFP 100 can establish a connection with the client device 102 over the P2P network 104. In some embodiments, the MFP 100 and client device 102 can be paired or linked to establish the connection. By way of a non-limiting example, the user interface 206 of the MFP 100 and/or user interface 306 of the client device 102 can be used to instruct the communication interface 208 of the MFP 100 and/or communication interface 308 of the client device 102 to temporarily or permanently enter a pairing mode in which either or both devices search for compatible devices that can be connected to over the P2P network 104. In some embodiments, an access code and/or password can be entered on either or both of the MFP 100 and client device 102 to link them over the P2P network 104.

In some embodiments and/or situations, the MFP 100 and client device 102 can be temporarily connected via the P2P network. In other embodiments and/or situations, information regarding established pairing relationships between a MFP 100 and a client device 102 can be saved at the MFP 100 and/or client device 102, such that the MFP 100 and client device 102 can be reconnected more quickly than establishing a new connection in the future.

At step 604, the MFP 100 can receive an operation request 500 from the client device 102 over the P2P network 104 at a particular network port 400. In some embodiments and/or situations where a client device 102 is or has been paired with more than one MFP 100, an application on the client device 102 can be configured to allow a user to select a P2P network 104 and/or which specific MFP 100 to send the operation request to on the P2P network 104. The application at the client device 102 can generate the operation request 500 based on the operation 404 to be requested, can insert the destination port number 502 associated with that operation, and send the operation request 500 to the MFP 100 over the P2P network 104. The MFP 100 can accept the operation request 500 at the network port 400 with a port number 402 matching the destination port number 502 indicated in the operation request 500.

At step 606, the MFP 100 can determine an operation 404 that was previously associated with the network port 400 through which the operation request 500 was received. In some embodiments the MFP 100 can compare the port number 402 of the network port 400 at which the operation request 500 was received against associations between network ports 400, port numbers 402 and/or operations 404 in a database or index file. In other embodiments the MFP 100 can move through a list of different operations 404 to determine if the operation request 500 was received at a network port 400 associated with any of the different operations 404, as shown in FIG. 7 below.

By way of a non-limiting example, when the MFP's network ports 400 were associated with operations 404 with the relationships shown in FIG. 4, the MFP 100 can determine that the client device 102 is requesting a print operation 404 when the operation request 500 was received at network port 400a, that the client device 102 is requesting a scan operation 404 when the operation request 500 was received at network port 400b, that the client device 102 is requesting a fax operation 404 when the operation request 500 was received at network port 400c, and that the client device 102 is requesting an upload operation 404 when the operation request 500 was received at network port 400n.

At step 608, the MFP 100 can perform the operation 404 associated with the network port 400 through which the operation request 500 was received. In some embodiments, the MFP 100 can also exchange data, configurations, operation status information, error messages, confirmation messages, and/or any other data or messages with the client device 102 before, during, and/or after performance of the operation 404.

Figure 7:
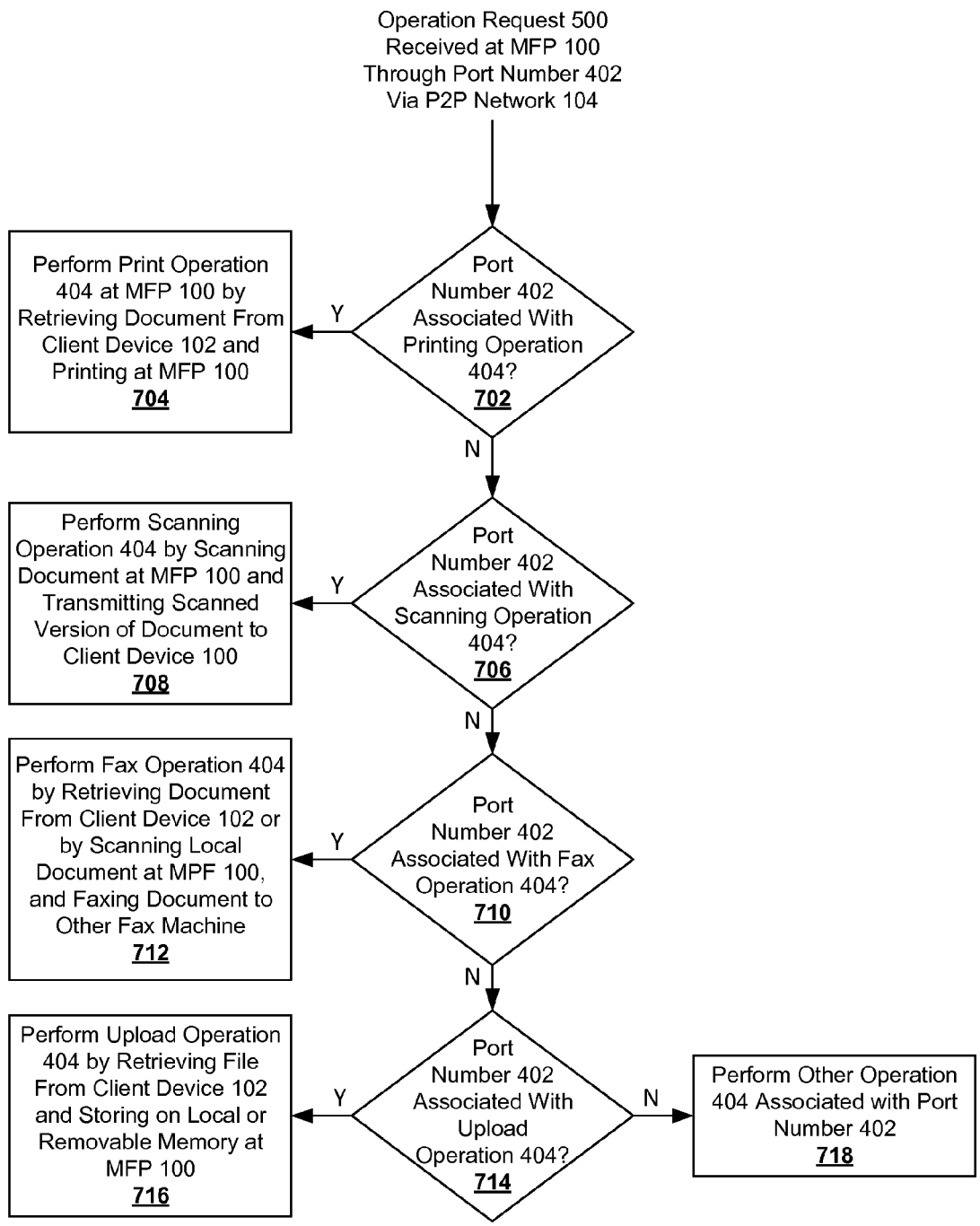
FIG. 7 depicts a non-limiting example of a process for determining which operation is being requested via an operation request and for performing that operation according to FIG. 6.

FIG. 7 depicts a non-limiting example of a process for determining which operation 404 is being requested via an operation request 500 and for performing that operation 404 according to steps 606 and 608 of FIG. 6. In some embodiments an MFP 100 can follow the steps of FIG. 7, while in other embodiments an MFP 100 can follow the steps of FIG. 7 in a different order and/or skip or add steps depending on which particular operations 404 have been associated with network ports 400 at the MFP 100. In still other embodiments an MFP 100 can use the port number 402 of the network port 400 through which the operation request 500 was received to look up the operation 404 associated with that port number 402 in an index file, database, or other format.

At step 702, the MFP 100 can determine whether the operation request 500 was received at a network port 400 associated with a print operation 404. If it was, the MFP 100 can move to step 704 and perform the print operation 404. If not, the MFP 100 can move to step 706.

At step 704 after determining, through the process of FIG. 7 or through any other process, that the operation request 500 was received at a network port 400 previously associated with a print operation 404, the MFP 100 can perform the print operation 404. In some embodiments, the MFP 100 can receive a document to be printed that is stored in the client device's data storage 304 via the P2P network 104. In some embodiments, the client device 102 can transmit a document to be printed to the MFP 100 along with the operation request 500, such as a document currently opened on the client device's screen or a file stored in the client device's data storage 304 that is or was selected by a user. In other embodiments, the MFP 100 can request a document from the client device 102 after confirming that the operation request was received at network port 400 previously associated with a print operation 404, and the client device can respond to that request by transmitting a document to the MFP 100, such as a document currently opened on the client device's screen or a file stored in the client device's data storage 304 that is or was selected by a user.

In some embodiments or situations, the MFP 100 can be configured to disable receiving documents from client devices 102 to be printed when the print operation 404 is requested with an operation request 500 over a P2P network 104. By way of a non-limiting example, the MFP 100 can be set to reject print operations 404 requested with an operation request 500 over a P2P network 104 when the operation request 500 is received, or can be set to reject all print operations 404 requested with operation requests 500 over the P2P network 104 prior to receipt of any operation requests 500.

After receipt of the document from the client device 102, the MFP 100 can print the document with its printer 210. In some embodiments, the MFP 100 can transmit status information with about the print operation 404 with the client device 102 as the print operation 404 is being performed, such as the percentage of total pages printed so far. In some embodiments, the MFP 100 can also or alternately transmit other information to the client device before, during, or after a print operation 404, such as an error message regarding a print operation 404 if the MFP 100 encounters any errors while performing the print operation 404, a confirmation message when the print operation 404 has completed, a history log of prior print operations 404, and/or a print queue list of pending print operations 404 from the client device 102 and/or other client devices 102.

At step 706, the MFP 100 can determine whether the operation request 500 was received at a network port 400 associated with a scan operation 404. If it was, the MFP 100 can move to step 708 and perform the scan operation 404. If not, the MFP 100 can move to step 710.

At step 708 after determining, through the process of FIG. 7 or through any other process, that the operation request 500 was received at a network port 400 previously associated with a scan operation 404, the MFP 100 can perform the scan operation 404. The MFP 100 can scan one or more documents with its scanner 212 that are placed on its scanner bed or platen and/or in a document feeder at the MFP 100. The scanned documents can then be transmitted to the client device 102 or to any other destination requested by the client device 102, such as a different client device 102, an email address, or a network address. In some embodiments scanned documents can also or alternately be stored in the MFP's local data storage 204 and/or on a removable digital storage device connected to a data storage connection port 216.

However, in other embodiments or situations the MFP 100 can be configured to disable sending scanned documents to other devices or locations and/or disable storing scanned documents in the MFP's local data storage 204 or on a removable digital storage device connected to a data storage connection port 216 when the scan operation 404 is requested with an operation request 500 over a P2P network 104, either after or before the operation request 500 is received. By way of a non-limiting example, the MFP 100 can be set to reject scan operations 404 requested with an operation request 500 over a P2P network 104 when the operation request 500 is received, or can be set to reject all scan operations 404 requested with operation requests 500 over the P2P network 104 prior to receipt of any operation requests 500.

In some embodiments, the MFP 100 can transmit status information with about the scan operation 404 with the client device 102 as the scan operation 404 is being performed, such as the percentage of total pages scanned so far and/or a destination address. In some embodiments, the MFP 100 can also or alternately transmit other information to the client device before, during, or after a scan operation 404, such as an error message regarding a scan operation 404 if the MFP 100 encounters any errors while performing the scan operation 404, a confirmation message when the scan operation 404 has completed, a history log of prior scan operations 404, and/or a scan queue list of pending scan operations 404 from the client device 102 and/or other client devices 102. In some embodiments the MFP 100 can request that a user of the client device 102 enter or confirm a desired scan quality or desired file size for a scanned document before proceeding with a scan operation 404, such that the scanning operation 404 can be performed by the MFP 100 at the desired quality or at a quality such that the total file size of the scanned documents is at or under the desired file size.

At step 710, the MFP 100 can determine whether the operation request 500 was received at a network port 400 associated with a fax operation 404. If it was, the MFP 100 can move to step 712 and perform the fax operation 404. If not, the MFP 100 can move to step 714.

At step 712 after determining, through the process of FIG. 7 or through any other process, that the operation request 500 was received at a network port 400 previously associated with a fax operation 404, the MFP 100 can perform the fax operation 404.

In some embodiments, the MFP 100 can receive a document to be faxed that is stored in the client device's data storage 304 via the P2P network 104, as well as a fax number for a receiving fax machine or receiving device. In some embodiments, the client device 102 can transmit a document to be faxed and/or the fax number of a receiving fax machine or device to the MFP 100 along with the operation request 500, such as a document and/or fax number currently opened on the client device's screen, a file stored in the client device's data storage 304 that is or was selected by a user, and/or a fax number entered or selected by a user. In other embodiments, the MFP 100 can request a document and/or fax number from the client device 102 after confirming that the operation request was received at network port 400 previously associated with a fax operation 404, and the client device can respond to that request by transmitting a document and/or fax number to the MFP 100, such as a document and/or fax number currently opened on the client device's screen, a file stored in the client device's data storage 304 that is or was selected by a user, and/or a fax number entered or selected by a user. The scanned documents can then be transmitted to another fax machine using the received fax number through a fax connection over telephone lines or through an internet or other network connection.

In other embodiments, the MFP 100 can scan one or more documents with its scanner 212 or a separate dedicated fax scanner. The MFP 100 can request and/or receive a fax number for a receiving fax machine from the client device 102 and/or through MFP's user interface 206. The scanned documents can then be transmitted to another fax machine or device using the received fax number through a fax connection over telephone lines or through an internet or other network connection.

In other embodiments or situations the MFP 100 can be configured to selectively disable the option to perform fax operations 404 when the fax operation 404 is requested with an operation request 500 over a P2P network 104 but still allow faxing operations 404 that are not requested with an operation request 500 over a P2P network 104, either after or before the operation request 500 is received. By way of a non-limiting example, the MFP 100 can be set to reject fax operations 404 requested with an operation request 500 over a P2P network 104 when the operation request 500 is received, or can be set to reject all fax operations 404 requested with operation requests 500 over the P2P network 104 prior to receipt of any operation requests 500.

In some embodiments, the MFP 100 can transmit status information with about the fax operation 404 with the client device 102 as the fax operation 404 is being performed, such as the percentage of total pages scanned so far, total number of pages successfully transmitted to a receiving fax machine, and/or the receiving fax number. In some embodiments, the MFP 100 can also or alternately transmit other information to the client device before, during, or after a fax operation 404, such as an error message regarding a fax operation 404 if the MFP 100 encounters any errors while performing the fax operation 404 or has difficulty connecting to the receiving fax machine, a confirmation message when the fax operation 404 has successfully completed and the faxed documents have been received by the receiving fax machine, a history log of prior fax operations 404, and/or a fax queue list of pending fax operations 404 from the client device 102 and/or other client devices 102.

At step 714, the MFP 100 can determine whether the operation request 500 was received at a network port 400 associated with an upload operation 404. If it was, the MFP 100 can move to step 716 and perform the upload operation 404. If not, the MFP 100 can move to step 718.

At step 716 after determining, through the process of FIG. 7 or through any other process, that the operation request 500 was received at a network port 400 previously associated with an upload operation 404, the MFP 100 can perform the upload operation 404. In some embodiments, the MFP 100 can receive one or more files to be uploaded that are stored in the client device's data storage 304 via the P2P network 104. In some embodiments, the client device 102 can transmit files to be uploaded to the MFP 100 along with the operation request 500, such as a document currently opened on the client device's screen or files stored in the client device's data storage 304 that are or were selected by a user. In other embodiments, the MFP 100 can request one or more files from the client device 102 after confirming that the operation request was received at network port 400 previously associated with an upload operation 404, and the client device can respond to that request by transmitting files to the MFP 100, such as a document currently opened on the client device's screen or files stored in the client device's data storage 304 that are or were selected by a user.

When sending files to be uploaded to the MFP 100, the client device 102 can indicate that the files are to be saved to the MFP's local data storage 204 or to a removable digital storage device, such as a USB flash drive, external hard disk drive, memory card, or any other removable data storage device connected to the MFP's data storage connection port 216. In some embodiments uploaded files can be stored in the MFP's local data storage 204 and can be later moved or copied to a removable digital storage device connected to the MFP's data storage connection port 216. In other embodiments files intended to be uploaded to a removable digital storage device can be stored directly on a connected removable digital storage device.

In some embodiments the MFP 100 can be configured to disable uploading files to the MFP's local data storage 204 when the upload operation 404 is requested with an operation request 500 over a P2P network 104 but still allow uploading files to a removable digital storage device connected to the MFP's data storage connection port 216, regardless of whether uploading files to local data storage 204 or to a removable digital storage device is enabled or disabled for upload operations 404 not requested with an operation request 500 over a P2P network. By way of a non-limiting example, the MFP 100 can be preset to reject upload operations 404 to local data storage 204 requested with an operation request 500 over a P2P network 104 when the operation request 500 is received, or can be set to reject all upload operations 404 to local data storage 204 requested with operation requests 500 over the P2P network 104 prior to receipt of any operation requests 500.

In some embodiments, the MFP 100 can transmit status information with about the upload operation 404 with the client device 102 as the upload operation 404 is being performed, such as the percentage of the uploaded files' total size uploaded so far, total number of files successfully uploaded to the MFP 100, and/or the file's destination address. In some embodiments, the MFP 100 can also or alternately transmit other information to the client device before, during, or after an upload operation 404, such as an error message regarding an upload operation 404 if the MFP 100 encounters any errors while uploading files or has difficulty connecting to a removable digital storage device, a confirmation message when the upload operation 404 has successfully completed and the uploaded documents are stored on the MFP's local data storage 204 or a removable digital storage device, a history log of prior upload operations 404, and/or an upload queue list of pending upload operations 404 from the client device 102 and/or other client devices 102.

At step 718, if the MFP 100 has not yet found an operation 404 associated with the network port 400 at which the operation request 500 was received, the MFP 100 can continue looking for an operation 404 associated with that network port 400. If such an operation 404 is found, such as additional functions of the MFP 100 not shown in FIG. 7, the MFP 100 can perform that operation 404. If such an operation 404 is not found, the MFP 100 can take no action or can inform the client device 102.

In some embodiments, the MFP 100 can handle operations 404 requested via operation requests 500 over the P2P network 104 at least partially differently than operations 404 requested locally or over a different type of network. By way of a non-limiting example, the MFP 100 can be configured with different settings when performing operations 404 requested with operation requests 500 over the P2P network 104 compared to operations 404 not requested with operation requests 500 over the P2P network. Non-limiting examples of specialized settings and/or actions for operations 404 requested via operation requests 500 over the P2P network 104 are shown in FIGS. 8-12.

Figure 8:
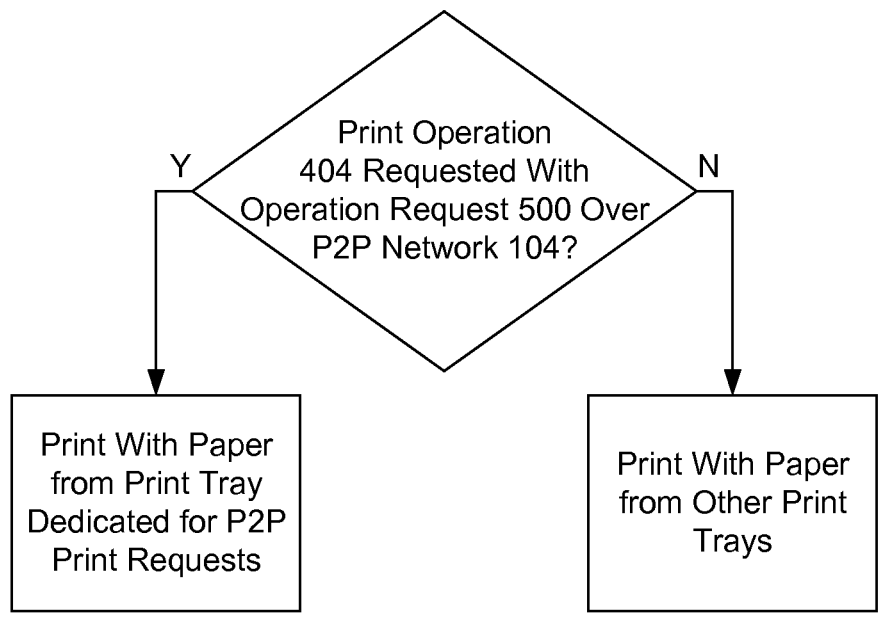
FIG. 8 depicts an example of a setting wherein print operations requested with operation requests over a P2P network are performed using paper from a different print tray compared to print operations requested in other ways.

As shown in FIG. 8, in some embodiments and/or situations when the MFP 100 102 initiates a print operation 404 requested with an operation request 500 via a P2P network 104, the MFP 100 can pull paper from a specific paper tray dedicated for print operations 404 requested with an operation request 500 via a P2P network 104. Other print operations 404 that are not requested via the P2P network 400 can be printed on paper from other print trays.

Figure 9:
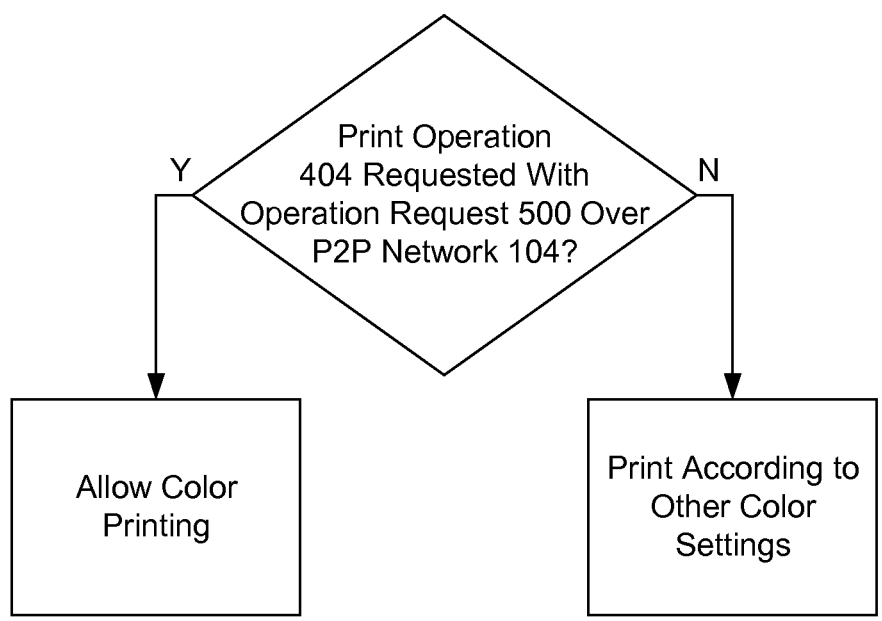
FIG. 9 depicts an example of a setting wherein color printing is enabled for print operations requested with operation requests over a P2P network, regardless of whether color printing is enabled for print operations requested in other ways.

As shown in FIG. 9, in some embodiments and/or situations when the MFP 100 initiates a print operation 404 requested with an operation request 500 via a P2P network 104, the MFP 100 can allow documents to be printed with its printer 210 in color, regardless of whether color printing is allowed for print operations 404 requested in other ways. Other print operations 404 that are not requested via the P2P network 400 can be subject to other color settings that have color printing allowed or disallowed. In alternate embodiments, the MFP 100 can be configured to disallow color printing when performing print operations 404 requested with operation requests 500 via the P2P network 104, regardless of whether color printing is allowed for print operations 404 requested in other ways.

Figure 10:
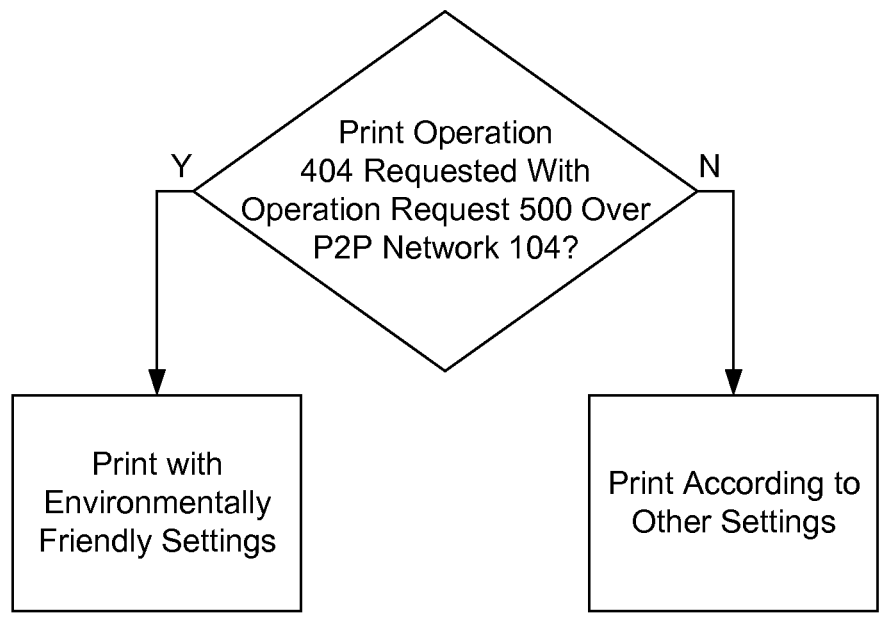
FIG. 10 depicts an example of a setting wherein print operations requested with operation requests via a P2P network are performed with environmentally friendly settings, regardless of whether such environmentally friendly settings have been set for print operations requested in other ways.

As shown in FIG. 10, in some embodiments and/or situations when the MFP 100 initiates a print operation 404 requested with an operation request 500 via a P2P network 104, the MFP 100 can print documents with environmentally friendly settings, regardless of whether such environmentally friendly settings have been set for print operations 404 requested in other ways. By way of a non-limiting example, when performing such print operations 404, the MFP 100 can be configured to use a decreased level of ink or toner, print on both sides of paper, use paper from a paper tray loaded with recycled paper, and/or adjust any other settings to conserve resources. Other print operations 404 that are not requested via the P2P network 400 can be subject to the same or different settings.

Figure 11:
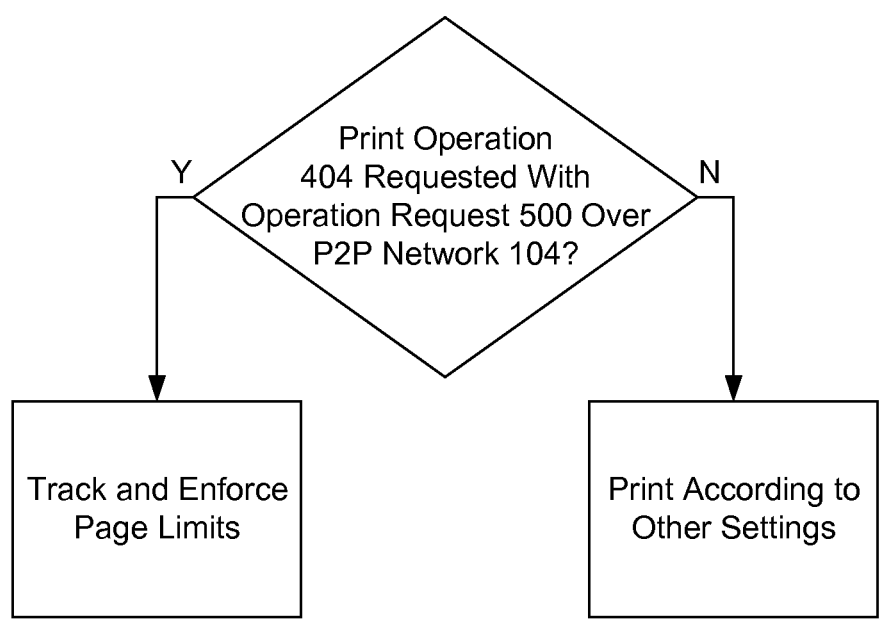
FIG. 11 depicts an example of a setting wherein print operations requested with operation requests via a P2P network are subject to page limits, regardless of whether such page limits have been set for print operations requested in other ways.

As shown in FIG. 11, in some embodiments and/or situations when the MFP 100 initiates a print operation 404 requested with an operation request 500 via a P2P network 104, the MFP 100 can track and enforce page limits for printing, regardless of whether such page limits have been set for print operations 404 requested in other ways. By way of a non-limiting example, the MFP 100 can be set to have a maximum page limit for print operations 404 requested by a particular client device 102 or by a particular user, and/or have a maximum number of pages that can be printed over a preset period of time for print operations 404 requested with operation requests 500 via a P2P network 104, such as a page limit per hour or per day.

In some embodiments, when the MFP 100 determines that a page limit has been reached, the MFP 100 can stop printing or not begin a print operation 404. In other embodiments, when the MFP 100 determines that a user or client device 102 is nearing a page limit or has reached a page limit, the MFP 100 can change or switch settings to reduce paper usage. The settings can be changed to user fewer sheets of paper in an attempt to decrease the chances of reaching the page limit, or to use fewer sheets of paper after a page limit has been reached while still allowing some printing to occur. By way of non-limiting examples, the MFP 100 can be set to switch to "n-in-1 printing" to print multiple pages of a document on a single piece of paper, and/or automatically skip printing pages that are detected to be blank. For example, when an MFP 100 detects that a client device 102 with only 50 pages left before reaching its page limit is requesting printing of a 100-page document, the MFP 100 can change settings to print that 100 page document with two pages per sheet to avoid going past the page limit. In some embodiments the MFP 100 can automatically change its settings to move into paper-usage reduction mode when a page limit has been reached or is within a predetermined number of pages or a preset percentage of the page limit. In other embodiments the MFP 100 can inform the requesting client device 102 that a page limit has been reached or is nearing, and can request that a user change one or more print settings to reduce paper usage before proceeding with the print operation 404.

In various embodiments or situations a maximum page limit for print operations 404 requested with operation requests 500 via a P2P network 104 can be higher, lower, or equal to a similar maximum page limit for print operations 404 requested in other ways. Other print operations 404 that are not requested via the P2P network 400 can be subject to the same or different settings regarding tracking and enforcing page limits, or not be subject to any page limits. In alternate embodiments the MFP 100 can be connected to a separate server, computer, or other device that tracks page and enforces page limits and can inform the MFP 100 to stop printing, not begin a print operation 404, or print with paper usage-reducing settings if a user or client device 102 has reached a particular page limit or is nearing a page limit.

Figure 12:
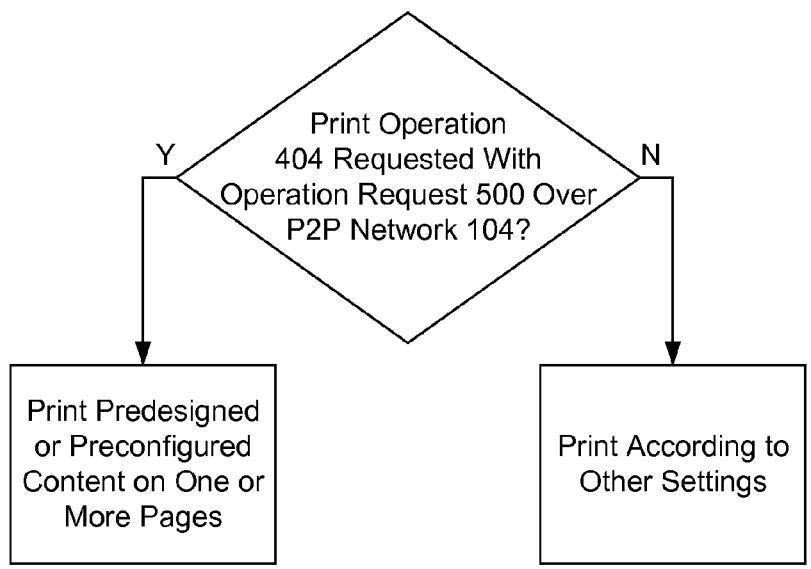
FIG. 12 depicts an example of a setting wherein predesigned or preconfigured content is printed on pages when performing print operations requested with operation requests via a P2P network, regardless of whether such predesigned or preconfigured content is set to be printed for print operations requested in other ways.

As shown in FIG. 12, in some embodiments and/or situations when the MFP 100 initiates a print operation 404 requested with an operation request 500 via a P2P network 104, the MFP 100 can print predesigned or preconfigured content on some or all pages, regardless of whether such predesigned or preconfigured content is set to be printed for print operations 404 requested in other ways. By way of non-limiting examples, when performing print operations 404 requested with an operation request 500 via a P2P network 104 the MFP 100 can be configured to print text or an image such as a company name, logo, print date, print time, watermark, stamp, and/or any other text or image at any desired location on the page, such as in the header, footer, margins, or across the face of the page. Other print operations 404 that are not requested via the P2P network 400 can be subject to the same or different settings regarding printing predesigned or preconfigured content on pages.

Figure 13:
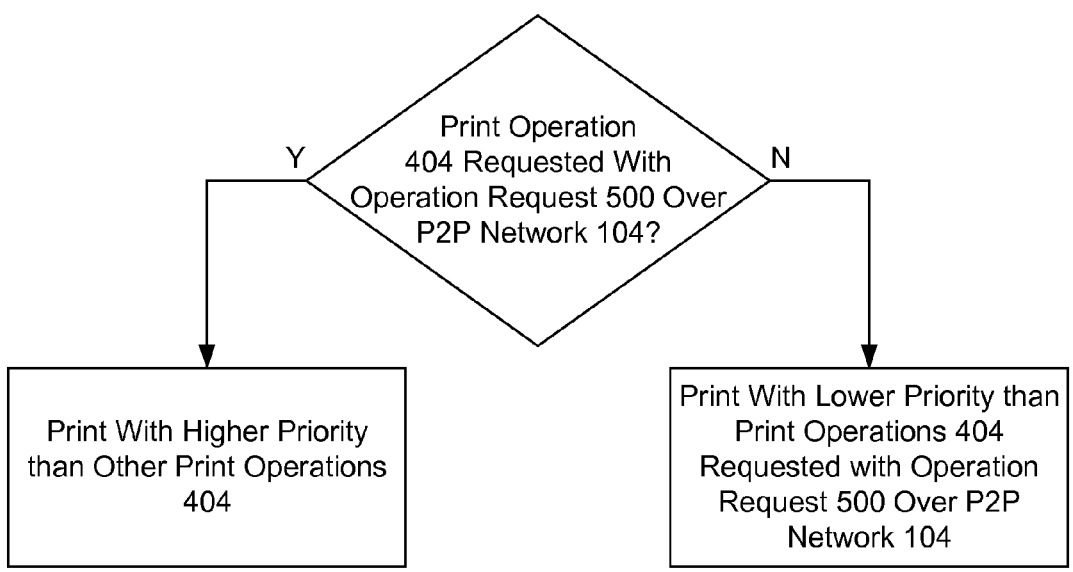
FIG. 13 depicts an example of a setting wherein print operations requested with operation requests via a P2P network are given higher priority than print operations requested in other ways.

As shown in FIG. 13, in some embodiments and/or situations when the MFP 100 initiates a print operation 404 requested with an operation request 500 via a P2P network 104, the MFP 100 can give higher priority to print operations 404 requested with an operation request 500 via a P2P network 104 compared to print operations 404 requested in other ways. By way of non-limiting examples, when the MFP's print queue has one or more queued print operations 404 from one or more client devices 102 that were requested with operation requests 500 via a P2P network 104 and one or more print operations 404 requested in other ways, the print operations 404 requested with operation requests 500 via the P2P network 104 can be given higher priority such that they can move to the front of the print queue immediately or more quickly than print operations 404 requested in other ways. In alternate embodiments, the MFP 100 can give lower priority to print operations 404 requested with an operation request 500 via a P2P network 104 compared to print operations 404 requested in other ways.

In some embodiments the MFP 100 can automatically treat operations 404 requested via operation requests 500 over the P2P network 104 at least partially differently than operations 404 requested locally or over a different type of network, as described above with respect to FIGS. 8-13. In alternate embodiments, before proceeding with an operation 404 requested via an operation request 500 over the P2P network 104, the MFP 100 can present a warning or confirmation message to the requesting client device 102 and/or request that a user of the client device 102 change settings to comply with the differing treatment rules in place for operations 404 requested via the P2P network 104.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A method, comprising:
    providing a multifunctional printer having a plurality of network ports opened, each of said plurality of network ports being associated with a different port number;
    associating each port number associated with one of said plurality of network ports with a specific operation type in memory at said multifunctional printer;
    establishing a connection between said multifunctional printer and a client device over a peer-to-peer network;
    receiving an operation request at said multifunctional printer from said client device over said peer to peer network through one of said plurality of network ports;
    determining an operation associated with said operation request at said multifunctional printer by finding the operation type associated with the port number of said one of said plurality of network ports through which said operation request was received; and
    performing said operation with said multifunctional printer,
    wherein said multifunctional printer is configured to perform said operation in a particular manner in response to receiving said operation request over said peer to peer network, regardless of how said multifunction printer is configured to perform said operation when said operation is initiated at said multifunctional printer in ways other than receiving an operation request over said peer to peer network.

2. The method of claim 1, further comprising sending status information about said operation from said multifunctional printer to said client device while said multifunctional printer is performing said operation.

3. The method of claim 1, further comprising sending configuration information about said operation from said multifunctional printer to said client device and waiting to perform said operation until confirmation or configuration changes are received at said multifunctional printer from said client device.

4. The method of claim 1, wherein said operation is a print operation wherein a document from said client device is received and printed at said multifunctional printer.

5. The method of claim 4, wherein said multifunctional printer has a plurality of paper trays, said plurality of paper trays comprising a dedicated paper tray for performing said print operation in response to receipt of said operation request over said peer-to-peer network and one or more additional paper trays for performing other print operations initiated in ways other than upon receipt of an operation request over said peer-to-peer network.

6. The method of claim 4, wherein said multifunctional printer is preconfigured to allow color printing when performing said print operation in response to receipt of said operation request over said peer-to-peer network, regardless of whether color printing is allowed for print operations requested in other ways.

7. The method of claim 4, wherein said multifunctional printer is preconfigured to print documents with environmentally friendly settings when performing said print operation in response to receipt of said operation request over said peer-to-peer network, regardless of whether said environmentally friendly settings have been set for print operations requested in other ways.

8. The method of claim 4, wherein said multifunctional printer is preconfigured with a lower maximum printable page limit when performing said print operation in response to receipt of said operation request over said peer-to-peer network compared to print operations requested in other ways.

9. The method of claim 4, wherein said multifunctional printer is preconfigured to print predesigned or preconfigured content on pages when performing said print operation in response to receipt of said operation request over said peer-to-peer network, regardless of whether said predesigned or preconfigured content has been set to print for print operations requested in other ways.

10. The method of claim 4, wherein said multifunctional printer is configured to selectively disallow performance of said print operation in response to said operation request received over said peer to peer network.

11. The method of claim 1, wherein said operation is a scan operation wherein a document is scanned with said multifunctional printer.

12. The method of claim 11, wherein a scanned version of said document generated with said scan operation is sent to said client device from said multifunctional printer and/or is stored in local or removable memory at said multifunctional printer.

13. The method of claim 1, wherein said operation is a fax operation wherein a document from said client device is received and faxed by said multifunctional printer.

14. The method of claim 13, wherein said multifunctional printer is configured to selectively disallow performance of said fax operation in response to said operation request received over said peer to peer network.

15. The method of claim 1, wherein said operation is an upload operation wherein one or more files from said client device is received by said multifunctional printer,
wherein when said upload operation is initiated in ways other than receiving an operation request over said peer-to-peer network, said files are stored in local or removable memory at said multifunctional printer, and
wherein when said upload operation is initiated in response to receipt of said operation request over said peer-to-peer network, said multifunctional printer is configured to disallow storage of said one or more files in local memory while allowing storage of said one or more files in removable memory, or is configured to selectively disallow performance of said upload operation.

16. The method of claim 1, wherein said multifunctional printer is preconfigured to prioritize said operation requested with said operation request over said peer-to-peer network over operations initiated in ways other than receiving an operation request over said peer to peer network.

17. A multifunctional printer, comprising:
a printer,
a scanner;
a processor configured to control said printer and said scanner;
a communication interface in communication with said processor, wherein said communication interface opens a plurality of network ports each associated with a different port number;
a memory device in communication with said processor; and
an operation database stored in said memory device, wherein said operation database comprises preset associations between each said port number and an operation type, wherein said communication interface is configured to establish a connection with a client device over a peer-to-peer network and receive an operation request from said client device over said peer to peer network through one of said plurality of network ports,
wherein said processor determines an operation associated with said operation request by finding the preset association between the port number of the network port through which said operation request was received and a particular operation type in said operation database,
wherein said processor instructs said printer to receive and print a document from said client device when said operation is a print function,
wherein said processor instructs said scanner to scan a document and send a scanned version to said client device when said operation is a scanner function, and
wherein said processor instructs that said operation be performed in a particular manner when said operation request is received over said peer to peer network, regardless of how said operation is configured to be performed when said operation is initiated in ways other than receiving an operation request over said peer to peer network.

18. A method, comprising:
providing a multifunctional printer having a plurality of network ports opened, each of said plurality of network ports being associated with a different port number;
associating each port number associated with one of said plurality of network ports with a specific operation type in memory at said multifunctional printer;
establishing a connection between said multifunctional printer and a client device over a peer-to-peer network;
receiving an operation request at said multifunctional printer from said client device over said peer to peer network through one of said plurality of network ports;
determining an operation associated with the port number of said one of said plurality of network ports through which said operation request was received;

when said operation is determined to be a print operation, performing said print operation by retrieving a print document from said client device and printing said print document at said multifunctional printer;

when said operation is determined to be a scan operation, performing said scan operation by scanning a scan document at said multifunctional printer and transmitting a scanned version of said scan document from said multifunctional printer to said client device;

when said operation is determined to be a fax operation, performing said fax operation by retrieving a fax document from said client device and faxing said fax document from said multifunctional printer to an external fax machine; and when said operation is determined to be an upload operation, performing said upload operation by retrieving a file from said client device and storing said file in memory connected to said multifunctional printer, wherein said multifunctional printer is configured to perform said operation in a particular manner in response to receiving said operation request over said peer to peer network, regardless of how said multifunction printer is configured to perform said operation when said operation is initiated at said multifunctional printer in ways other than receiving an operation request over said peer to peer network.

19. The method of claim 6, wherein said multifunctional printer is preconfigured to allow color printing when performing said print operation in response to receipt of said operation request over said peer-to-peer network, and wherein color printing is not allowed for print operations requested in other ways.

20. The method of claim 7, wherein said multifunctional printer is preconfigured to print documents with environmentally friendly settings when performing said print operation in response to receipt of said operation request over said peer-to-peer network, and said environmentally friendly settings have not been set for print operations requested in other ways.

* * * * *